US012732034B2

(12) United States Patent
Knoblauch

(10) Patent No.: US 12,732,034 B2
(45) Date of Patent: Sep. 8, 2026

(54) STATOR OF AN ELECTRIC MACHINE AND AN ELECTRIC MACHINE WITH AXIAL AND RADIAL COOLANT CHANNELS

(71) Applicant: Dr. Ing. h.c. F. Porsche Aktiengesellschaft, Stuttgart (DE)

(72) Inventor: Daniel Knoblauch, Leonberg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 268 days.

(21) Appl. No.: 18/302,798

(22) Filed: Apr. 19, 2023

(65) Prior Publication Data

US 2023/0344286 A1 Oct. 26, 2023

(30) Foreign Application Priority Data

Apr. 22, 2022 (DE) ......................... 102022109800.1

(51) Int. Cl.
*H02K 1/20* (2006.01)

(52) U.S. Cl.
CPC ........... *H02K 1/20* (2013.01); *H02K 2201/09* (2013.01)

(58) Field of Classification Search
CPC ............ H02K 1/20; H02K 3/24; H02K 9/197; H02K 2201/09; H02K 1/165; H02K 3/487; H02K 3/493
USPC ............. 310/58, 59, 60 A, 216.016, 216.065
See application file for complete search history.

(56) References Cited

U.S. PATENT DOCUMENTS

| | | | | |
|---|---|---|---|---|
| 10,784,738 B2 | 9/2020 | Berendes et al. | | |
| 2007/0024129 A1* | 2/2007 | Pfannschmidt | H02K 1/20 | 310/59 |
| 2010/0237727 A1* | 9/2010 | Mantere | H02K 9/10 | 310/64 |
| 2016/0006302 A1* | 1/2016 | Gugel | H02K 3/24 | 310/54 |

(Continued)

FOREIGN PATENT DOCUMENTS

| | | |
|---|---|---|
| DE | 102011056007 A1 | 6/2012 |
| DE | 102017102141 A1 | 8/2018 |

(Continued)

*Primary Examiner* — Michael Andrews
(74) *Attorney, Agent, or Firm* — LEYDIG, VOIT & MAYER, LTD.

(57) ABSTRACT

A stator of an electric machine includes a stator lamination package including a plurality of stator laminations and a coolant guide arranged between the stator laminations. The stator laminations include radially inward recesses and stator windings are arranged in the stator grooves, directly around which windings a coolant can flow within the stator grooves. The coolant guide includes first lamination blanks axially bordering the coolant guide on opposite sides thereof. The coolant guide includes second lamination blanks arranged between the first lamination blanks. The first and second lamination blanks and the stator laminations radially include recesses. Only the second lamination blanks additionally include radial coolant channels configured to guide coolant radially inward or radially outward. The radially inward recesses of the stator laminations and the lamination blanks are closed in a radially inward direction, and axially adjacent stator laminations and lamination blanks are glued together in a laminar manner.

14 Claims, 12 Drawing Sheets

(56) References Cited

U.S. PATENT DOCUMENTS

2016/0156251 A1* 6/2016 Sakurai .................. H02K 9/197
310/58
2016/0190878 A1* 6/2016 Saari ........................ H02K 9/04
310/59
2020/0227977 A1* 7/2020 Bradfield ................. H02K 9/00
2021/0203197 A1* 7/2021 Saint-Michel ......... H02K 1/148
2022/0052576 A1* 2/2022 Knoblauch .............. H02K 5/10
2023/0243339 A1* 8/2023 Teringl ..................... H02K 9/12
310/58

FOREIGN PATENT DOCUMENTS

DE 102020106798 A1 9/2021
EP 2076956 B1 6/2017
EP 3157138 B1 7/2018

* cited by examiner 35
33
42
34
33
54
46
20
55
18
36
46
37
41
39
54
49
13
11

STATOR OF AN ELECTRIC MACHINE AND AN ELECTRIC MACHINE WITH AXIAL AND RADIAL COOLANT CHANNELS

CROSS REFERENCE TO RELATED APPLICATIONS

This application claims benefit to German Patent Application No. DE 10 2022 109 800.1, filed on Apr. 22, 2022, which is hereby incorporated by reference herein.

FIELD

The invention relates to a stator of an electric machine and an electric machine.

BACKGROUND

An electric machine comprises a stator and a rotor. The stator is also referred to as the stationary portion and the rotor is also referred to as the rotating portion. An air gap is formed between the rotor and the stator. The stator typically comprises a stator lamination package having stator grooves, which receive stator windings. The rotor typically comprises a rotor lamination package having magnets or rotor windings or ladder rods received in recesses of the rotor.

In order to effectively cool a stator, i.e., the stator windings of a stator, it is already known that coolant flows directly around the stator windings received in the stator grooves. In order to prevent the coolant from entering the gap between the stator and the rotor, it is in practice known to arrange a sealing body in the gap between the stator and the rotor. Such a sealing body arranged in the gap between the stator and the rotor of an electric machine can be designed as a gap tube or a liner. As such, a gap tube is dimensionally stable and is arranged in an precured state in the gap between the stator and the rotor. A liner is formed by a pre-form of the liner not yet having been cured and not yet stable in shape, then arranged in a cavity of the stator before being cured during formation of the liner. In this context, the liner then typically makes a material-locking connection to the stator lamination package of the stator.

DE 10 2017 102 141 A1 and DE 10 2020 106 798 A1 each disclose an electric machine having a sealing body arranged between a stator and a rotor. Further stators of electric machines are known from EP 3 157 138 B1, EP 2 076 956 B1, and from DE 10 2011 056 007 A1. Different cooling concepts for cooling the stator of an electric machine are each disclosed.

There is a need for a stator of an electric machine that enables improved direct cooling of the stator windings of the stator along with a simple stator design. Further, there is a need for an electric machine having such a stator.

SUMMARY

In an embodiment, the present disclosure provides a stator of an electric machine, comprising a stator lamination package comprising a plurality of stator laminations and a coolant guide arranged between the stator laminations of the stator lamination package. The stator laminations comprise radially inward recesses, portions of which border axially extending stator grooves, and stator windings are arranged in the stator grooves, directly around which windings a coolant can flow within the stator grooves. The coolant guide comprises first lamination blanks axially bordering the coolant guide on opposite sides thereof. The coolant guide comprises second lamination blanks arranged between the first lamination blanks. The first lamination blanks and the second lamination blanks as well as the stator laminations radially comprise recesses for bordering the stator grooves and for receiving the stator windings. Only the second lamination blanks additionally comprise radial coolant channels extending radially outward from the stator grooves and configured to guide coolant radially inward towards the stator grooves or radially outward from the stator grooves. The radially inward recesses of the stator laminations and the lamination blanks of the coolant guide and thus the stator grooves are closed in a radially inward direction, and axially adjacent stator laminations and lamination blanks of the stator lamination package and the coolant guide are glued together in a laminar manner.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
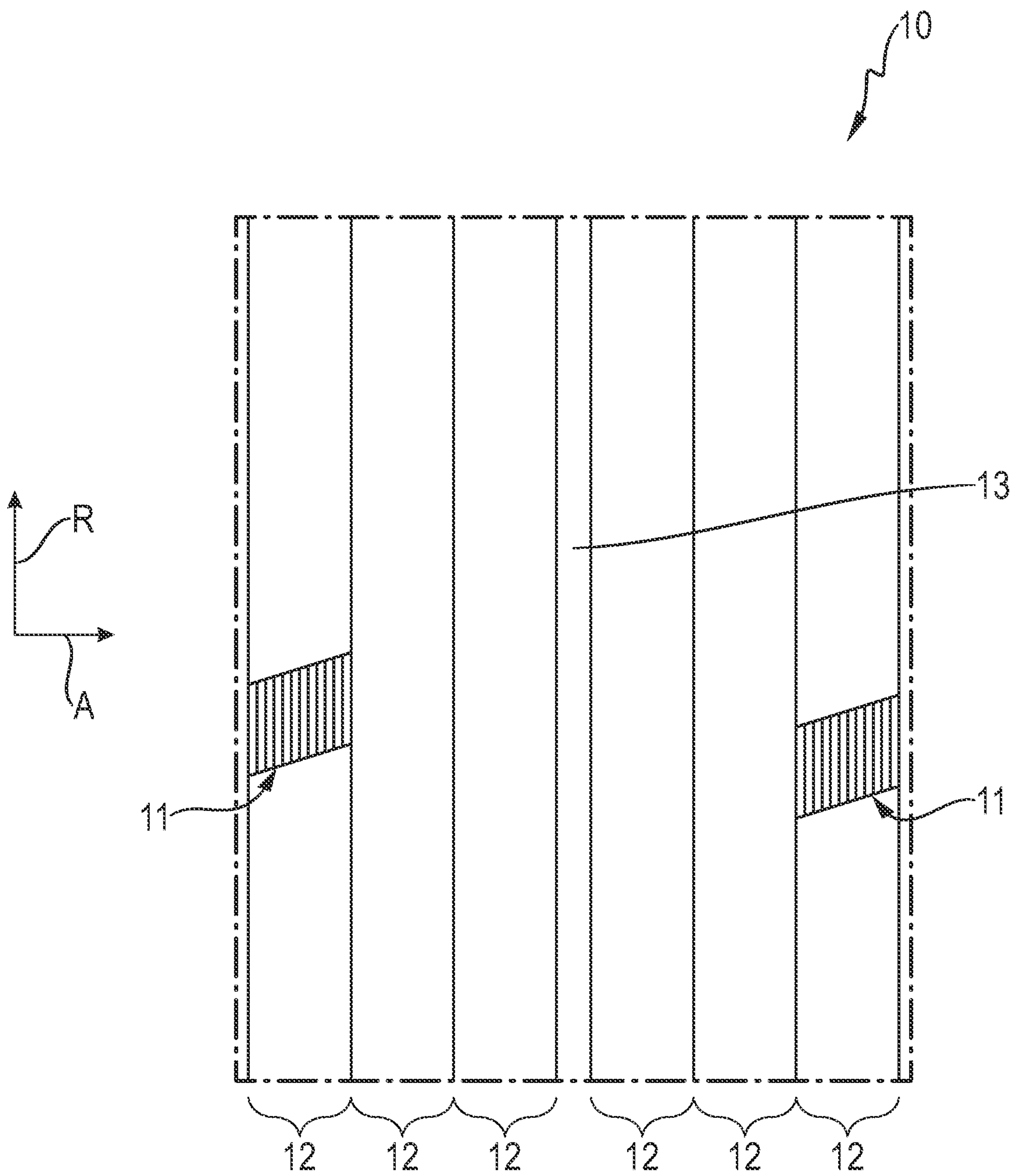
FIG. 1 illustrates a side view of a stator of an electric machine.

In an embodiment, the invention provides a novel stator of an electric machine and an electric machine having such a stator.

The stator according to an embodiment of the invention comprises a plurality of stator laminations comprising a stator lamination package, with the stator laminations comprising radially inward recesses, portions of which border the stator grooves extending in the axial direction.

The stator according to an embodiment of the present invention comprises stator windings arranged in the stator grooves, directly around which windings a coolant can flow within the stator grooves.

The stator according to an embodiment of the invention comprises a coolant guide element arranged between the stator laminations of the stator lamination package.

The coolant guide element of the stator according to an embodiment of the invention comprises first lamination blanks, which axially border the coolant guide element on opposite sides thereof.

The coolant guide element of the stator according to an embodiment of the invention further comprises second lamination blanks arranged between the first lamination blanks.

The first and second lamination blanks of the coolant guide element and the stator laminations are similar in that the first lamination blanks and the second lamination blanks as well as the stator laminations comprise radially inward recesses for forming the stator grooves and for receiving the stator windings.

The second lamination blanks of the coolant guide element are designed to differ from the first lamination blanks and the stator blanks such that only the second lamination blanks additionally comprise radial coolant channels extending radially outwards from the stator grooves, which channels are configured to guide coolant radially inwards, towards the stator grooves, or radially outwards from the stator grooves.

The radially inward recesses of the stator laminations and the lamination blanks of the coolant guide element, and therefore the stator grooves of the stator according to an embodiment of the invention, are closed radially inward.

Axially adjacent stator laminations and lamination blanks of the stator lamination package and the coolant guide element of the stator according to an embodiment of the invention are glued together in a laminar manner.

The stator according to an embodiment of the present invention comprises the coolant guide element arranged between the stator laminations of the stator lamination package. The coolant guide element comprises the first lamination blanks and the second lamination blanks, with the second lamination blanks comprising the additional radial coolant guide channels. The stator laminations and the first and second lamination sections each comprise, radially inward, the recesses for forming and bordering the stator grooves, with said recesses, and therefore the stator grooves, being closed radially inward. The axially adjacent stator laminations and lamination blanks are glued in a laminar manner. An embodiment of the invention enables effective cooling of the stator, i.e., direct cooling of the stator windings received in the stator grooves, along with a simple stator design.

Depending on the direction of flow, the radial coolant channels of the second lamination blanks of the coolant guide element can guide the coolant from radially inward starting from the stator grooves, radially outward, or from radially outward to radially inward, towards the stator grooves.

By virtue of the stator grooves being closed radially inward and adjacent stator laminations and lamination blanks being glued together in a laminar manner, i.e., adjoining at least radially inward of the recesses of the stator laminations forming the stator grooves and the lamination blanks of the coolant guide element forming the stator grooves, there exists no inherent risk that coolant will flow radially inward from the stator grooves, i.e., entering into a gap between the stator and a rotor of an electric machine comprising the stator. Accordingly, it is in principle possible to omit a separate sealing body between the stator and the rotor.

Preferably, the stator laminations, the first lamination blanks, and the second lamination blanks are made from an identical material. If the stator laminations and the lamination blanks of the coolant guide element are then made from an identical material, a homogeneous stator structure results with uniform material properties and uniform component behavior. Preferably, the stator laminations and lamination blanks are manufactured using the same electrical lamination.

Preferably, the coolant guide element is arranged in the axial direction in the center of the stator lamination package. In this case, a particularly advantageous coolant guide is then possible.

Preferably, the first lamination blanks of the coolant guide element axially cover the radial coolant channels of the second lamination blanks of the coolant guide element. Doing so provides advantageous guiding of the coolant within the coolant guide element.

Preferably, at least the stator laminations of the stator lamination package and the first lamination blanks of the coolant guide element comprise radially outward recesses, at least portions of which border the axial coolant channels for guiding the coolant. Particularly advantageous coolant guiding within the stator is also possible thereby.

Preferably, at least the first lamination blanks of the coolant guide element and the stator laminations comprise radially outward cavities designed to provide radial deformability for the stator. These cavities facilitate assembly of an electric machine comprising the stator.

The stator preferably comprises a sealing body, which adjoins the stator laminations, the first lamination blanks, and the second lamination blanks in a radially inward direction, and which projects in an axial direction opposite the stator lamination package. In particular, the sealing body is designed as a self-stable gap tube, which adjoins the stator laminations and the first and second lamination blanks radially inward without being connected to the stator lamination package. As already stated above, the stator grooves are closed radially inward. A sealing body in the gap between the stator and the rotor can in principle then be omitted. However, a bar which adjoins the stator grooves in a radially inward direction, is designed to be very thin-walled in order to ensure particularly advantageous electromagnetic behavior of the stator, and it preferably only has a thickness of a few tenths of a millimeter or millimeters. It is therefore preferred that the stator comprise a sealing body that adjoins the stator laminations in a radially inward direction and, in the event that a bar enclosing the stator grooves in a radially inward direction should fail during the service life of the electric machine due to high coolant pressure levels, prevents the coolant from entering the gap between the stator and the rotor In this case, the sealing body can then be designed as a self-stable gap tube, which can have a thin-walled design in the area of the gap between the stator and the rotor.

Preferred embodiments of the invention follow from the dependent claims and the following description. Without being restricted thereto, embodiments of the invention will be explained in greater detail with reference to the drawings.

Embodiments of the invention relate to a stator of an electric machine as well as an electric machine.

An electric machine comprises a stator and a rotor. The stator is also referred to as the stationary portion, and the rotor is also referred to as the rotating portion. A gap is formed between the rotor and the stator. An embodiment of the present invention relates to the stator of an electric machine.

FIG. 1 illustrates a side view of a stator lamination package 10 of a stator of an electric machine. The stator lamination package 10 has a plurality of stator laminations 11 that are arranged in a stack adjacent one another in the axial direction A of the stator and, therefore, of the stator lamination package 10.

A plurality of stator laminations 11 can be assembled into a substack 12, with a plurality of substacks 12 arranged adjacent to one another in axial direction A and made from stator laminations 11 forming the stator lamination package 10.

The stator 10 further comprises a coolant guide element 13 arranged between the stator laminations 11 of the stator lamination package 10, i.e., in FIG. 1 between two partial stacks 12 of the stator lamination package 10 consisting of a plurality of stator laminations 11.

FIGS. 2, 3, 4, 5, 6, and 7 each show different details of the coolant guide element 13, with some details described for the coolant guide element 13 also being applicable to the stator laminations 11.

Figure 2:
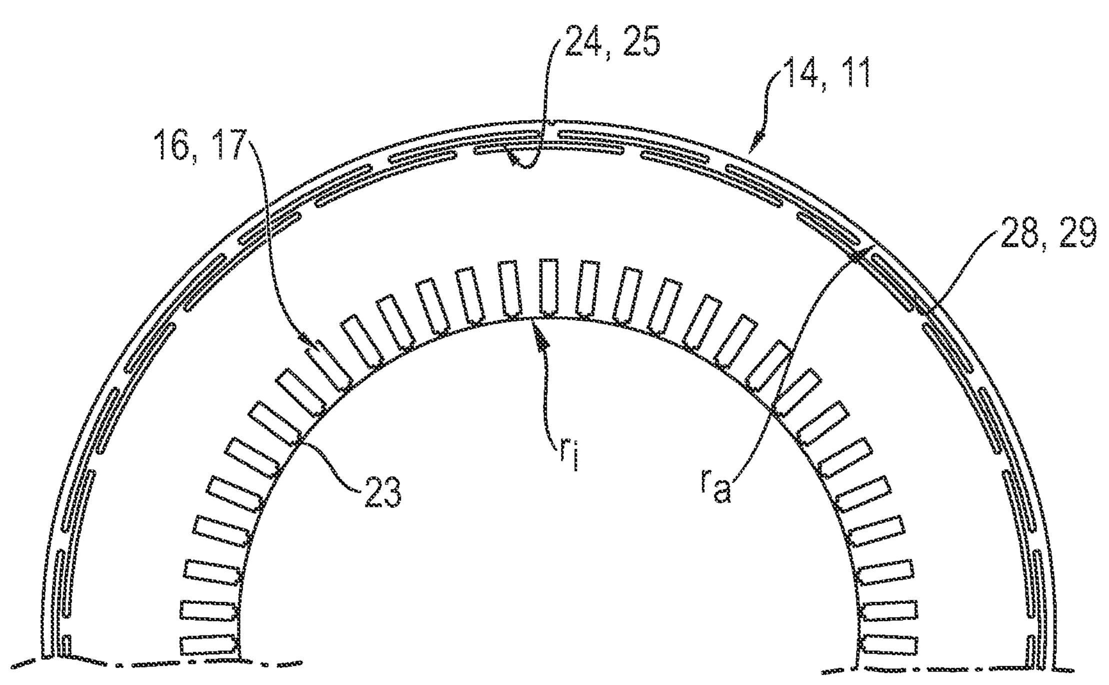
FIG. 2 illustrates a side sectional view of a coolant guide element of the stator.
Figure 3:
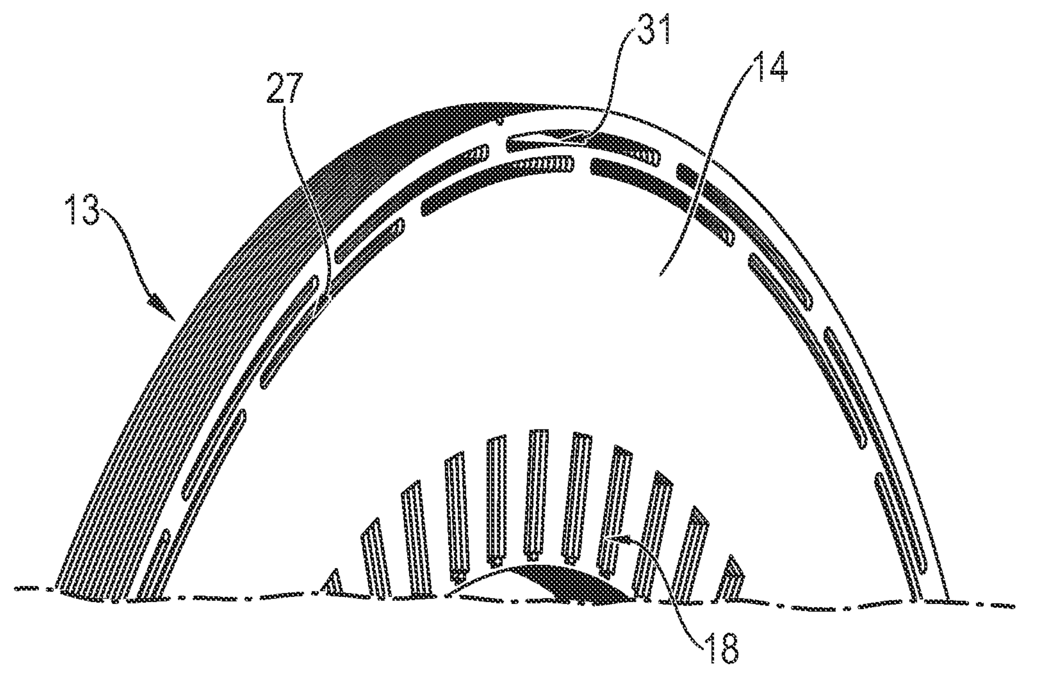
FIG. 3 illustrates a perspective view of FIG. 2.
Figure 4:
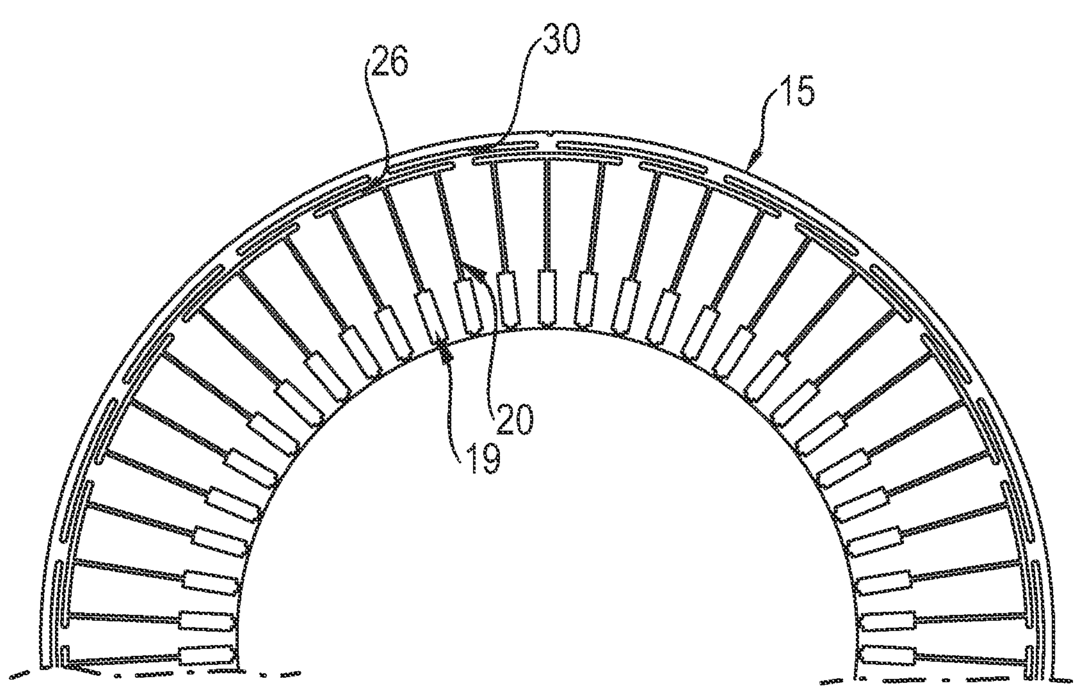
FIG. 4 illustrates a cross section in radial cutting direction through FIG. 2.

The coolant guide element 13 is made from first lamination blanks 14 and second lamination blanks 15. FIG. 2 shows a detail of a first lamination blank 14. FIG. 4 shows a detail of a second lamination blank 15. The lamination blanks 14 and 15 are arranged in a stack adjacent to one another in axial direction A, whereby the first lamination blanks 14 axially border the coolant guide element 13 on opposite sides, and whereby the second lamination blanks 15 are arranged in axial direction A of the stator when viewed between the first lamination blanks 14.

The first lamination blanks 14 are similar to, preferably identical to, the stator laminations 11. Both the first lamination blanks 14 and the stator laminations 11 then comprise radially inward recesses 16, 17, portions of which border the stator grooves 18 of the stator lamination package in axial direction A.

These stator grooves 18 extend continuously through axial direction A of the stator lamination package 10, i.e., through the substacks 12 and the coolant guide element 13, so that the second lamination blanks 15 also comprise radially inward recesses 19 which, together with the recesses 16, 17 of the first lamination blanks 14 and the stator laminations 11, define the stator grooves 18 for receiving stator windings 22.

Figure 5:
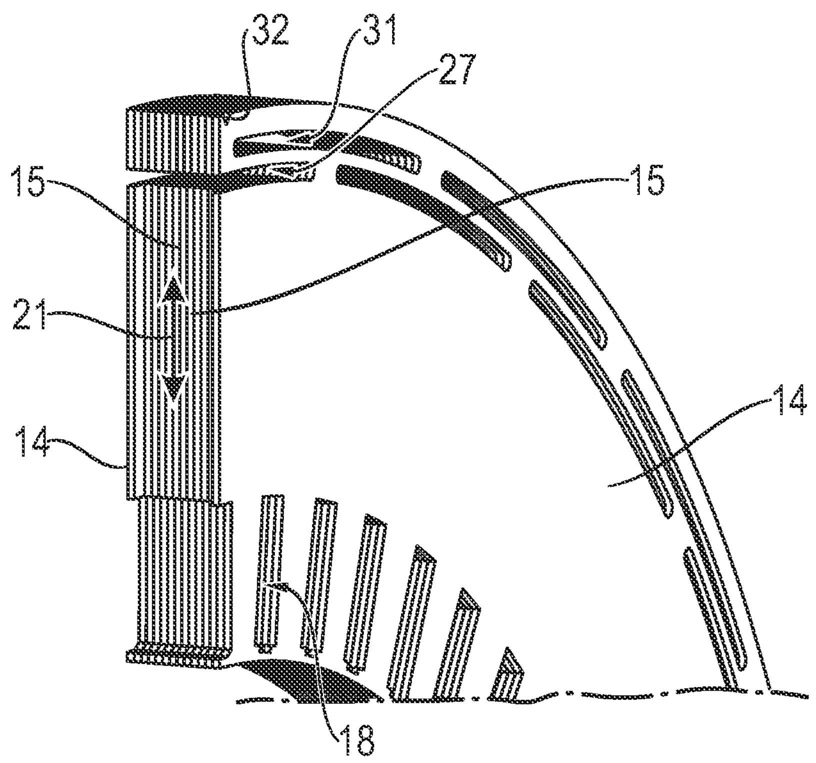
FIG. 5 illustrates a cross section in axial cutting direction through FIG. 3.
Figure 6:
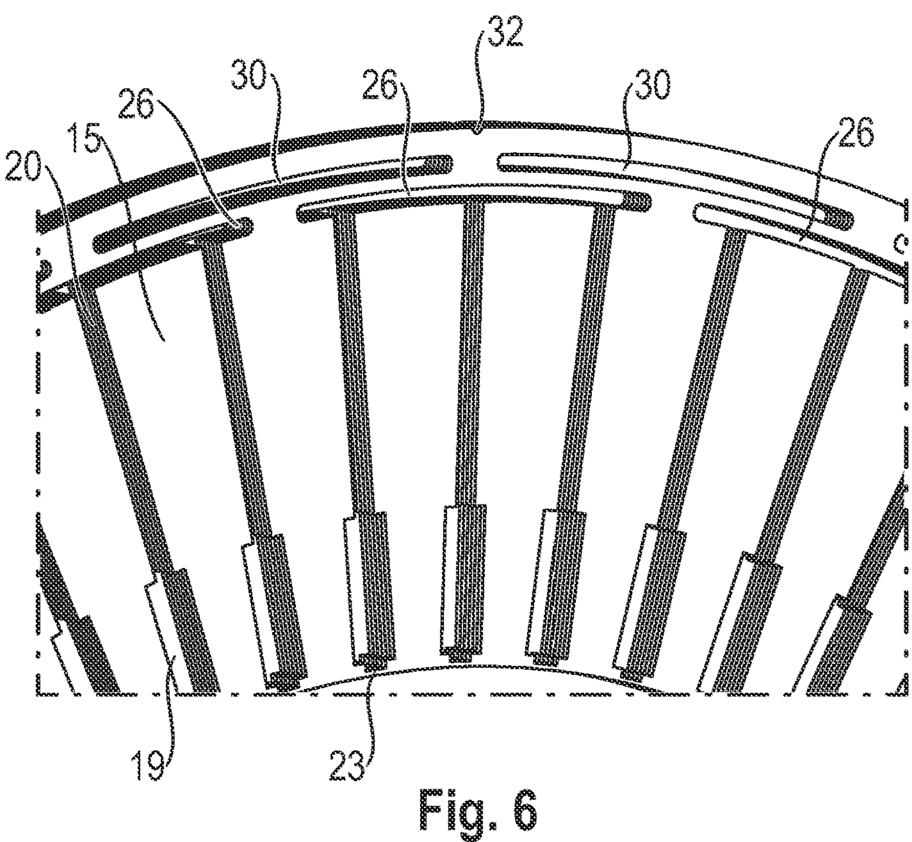
FIG. 6 illustrates a detail of FIG. 4.

The second lamination blanks 15 are designed to differ from the first lamination blanks, 14 and thus the stator blanks 11, i.e., such that only the second lamination blanks 15 additionally comprise radial coolant channels 20 extending radially outward from the stator grooves 18 or recesses 19 of the second lamination blanks 15. Through these radial coolant channels 20, coolant can be fed radially inward towards the stator grooves 18 or radially outward from the stator grooves 18. The double arrow 21 of FIG. 5 illustrates the two different possible flow directions for the coolant through the radial coolant channels 20 of the second lamination blanks 15 of the coolant guide element 13.

Figure 7:
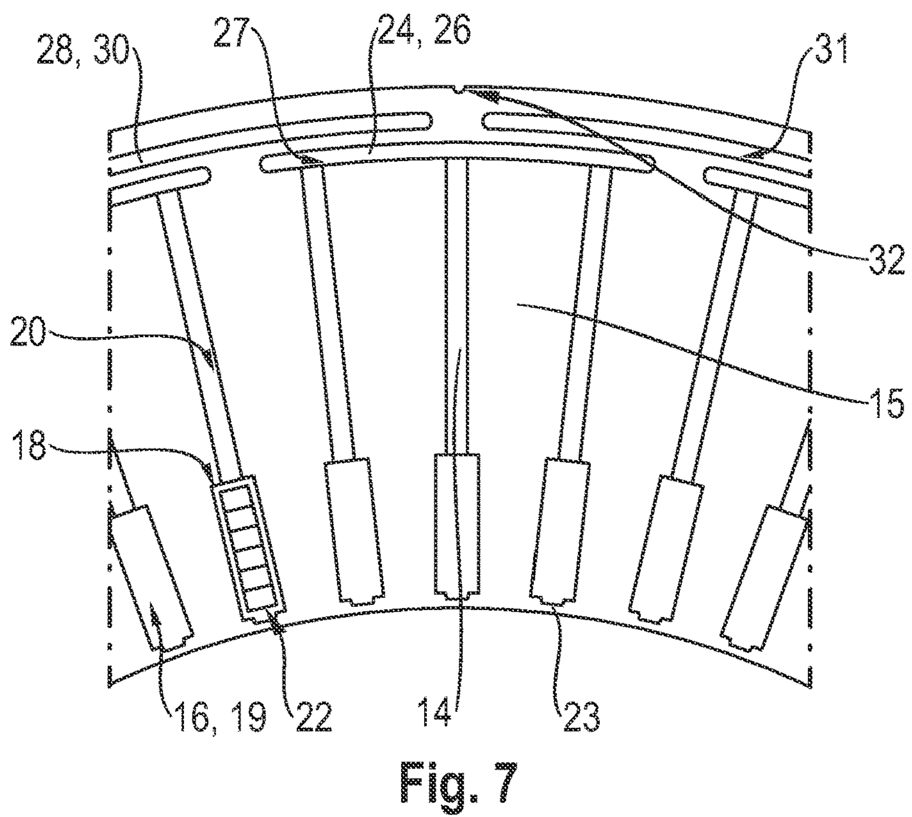
FIG. 7 illustrates another detail of a stator.

As explained, stator windings 22 are arranged in the stator grooves 18, which are bordered by the recesses 16, 17, and 19 of the lamination blanks 14, 15 and the stator laminations 11. FIG. 7 shows recesses 16, 19 of the lamination blanks 14, 15 of the coolant guide element 13 in the area of a stator groove 18 or in the area of the stator groove 18, portions of which recesses define a stator winding 22 of this kind.

Coolant within the stator grooves 18 is able to flow directly through the stator windings 22 received within the stator grooves 18.

The radially inward recesses 16, 17, 19 of the lamination blanks 14, 15 of the coolant guide element 13 and the stator laminations 11 are closed radially inward by means of bars 23. These bars 23 are thin-walled. The respective bar 23 has a maximum thickness of a few tenths of a millimeter or millimeters. Coolant flowing through stator grooves 18 for the direct cooling of stator windings 22 therefore cannot flow radially inward starting from stator grooves 18, i.e., towards a gap between the stator lamination package 10 and a rotor received by said package.

Axially adjacent stator laminations 11 and lamination blanks 14, 15 are glued together in a laminar manner, i.e., at least radially inward in the area of the bars 23, as well as in the circumferential direction between the bars 23 and in the axial direction seen between the recesses 16, 17, 19. This laminar gluing also prevents coolant from flowing radially inward via gaps between the stator laminations 11 and the lamination blanks 14, 15 adjoining one another. It is preferably provided that axially adjacent stator laminations 11 and lamination blanks 14, 15 are respectively glued together in a laminar manner.

The coolant guide element 13 serves to guide coolant either from radially outward to radially inward towards the stator grooves 18, or vice versa, from radially inward to radially outward away from the stator grooves 18, depending on the coolant guide selected for the stator lamination package 10.

In the exemplary embodiment shown in FIGS. 2 to 7, the stator laminations 11 and the first lamination blanks 14 comprise radially outward recesses 24, 25, and, in the exemplary embodiment shown in FIGS. 2 to 7, the second lamination blanks 15 comprise radially outward recesses 26, in which case these recesses 24, 25 and 26 of the lamination blanks 14 and 15 and the stator laminations 11 define axial coolant channels 27.

The axial coolant channels 27, like the stator grooves 18, extend across the entire axial direction A of the stator lamination package 11 and serve to guide coolant in axial direction A.

In the area of the coolant guide element 13, these axial coolant channels 17 are connected to the stator grooves 18, i.e., via the radial coolant channels 20 of the second lamination blanks 15 of the coolant guide element 13. Accordingly, depending on the direction of flow through the radial coolant channels 20, coolant first passes through the stator grooves 18 and then through the axial coolant channels 27, or first through the axial coolant channels 27 and then through the stator grooves 18.

According to FIG. 7, the first lamination blanks 14 of the coolant guide element 13 cover the radial coolant channels 20 of the second lamination blanks 15 on the axial sides of the coolant guide element 13. The coolant can therefore flow between the stator grooves 18 and the axial coolant channels 27 only in the area of the second lamination blanks 15 of the coolant guide element 13.

In the exemplary embodiment shown in FIGS. 2 to 7, both the stator laminations 11 and the lamination blanks 14, 15 comprise additional recesses 28, 29, 30 radially outward of the recesses 24, 25, 26 (which define the axial coolant channels 27), which additional recesses together define cavities 31 extending in an axial direction. In the exemplary embodiment shown, the cavities 31 are not used to guide the coolant, but rather to provide a radially deformable stator lamination package 11 when assembled in a housing of an electric machine.

Accordingly, an essential component of the stator 10 according to an embodiment of the invention is the coolant guide element 13. The coolant guide element is arranged between the stator lamination packages 11 of the stator lamination package 10, preferably in the axial direction in the center of the stator lamination package 10.

Like the stator laminations 11, the lamination blanks 14, 15 are in this case made of electrical lamination, preferably made from the same material or an identical material. Accordingly, the coolant guide element 13 can contribute to torque and power formation by the electric machine. The result is a homogeneous stator structure with uniform material properties and uniform component behavior.

The first lamination blanks 14, which border the coolant guide element 13 on its axial sides, are preferably identical to the actual stator laminations 11. The second lamination blanks 15 of the coolant guide element 13 are designed to differ from both the first lamination blanks 14 and the stator laminations 11, i.e., at least by the second lamination blanks 15 of the coolant guide element 13 comprising the radial coolant channels 20.

If, as shown for the exemplary embodiment in FIGS. 2 to 7, the lamination blanks 14, 15 and the stator laminations 11 have identical designs apart from the radial coolant channels 20 on the second lamination blanks 15, then the coolant guide element 13 can be manufactured with little effort. To form the second lamination blanks 15, the first lamination blanks 14 or the stator laminations 11 need only be punched out of the radially extending coolant channels 20.

The stator grooves 18 which receive the stator windings 22 are closed radially inward. Adjoining stator laminations 11 and lamination blanks 14, 15 are preferably glued in an entirely laminar manner.

Coolant, in particular oil flowing through the stator grooves 18, will not then travel radially inwards, towards a rotor or a gap formed between the rotor and the stator.

In order to exactly align the individual lamination blanks 14, 15 for the coolant guide element 13 with respect to one another during assembly, a recess 32 is introduced into the lamination blanks 14, 15 at a radially outward circumferential position. The lamination blanks 14, 15 will then be flush when they are exactly aligned with respect to one another at a circumferential position of the stator lamination package 10.

As previously explained, the stator grooves 18 are closed radially inward by means of the bars 23. In addition, stator laminations 11 and lamination blanks 14, 15 arranged adjacent to one another are glued radially inward in a laminar manner. In this way, it is ensured that no coolant can flow radially inward in the area of the stator lamination package 11, towards a rotor or a gap between the stator and the rotor.

Figure 8:
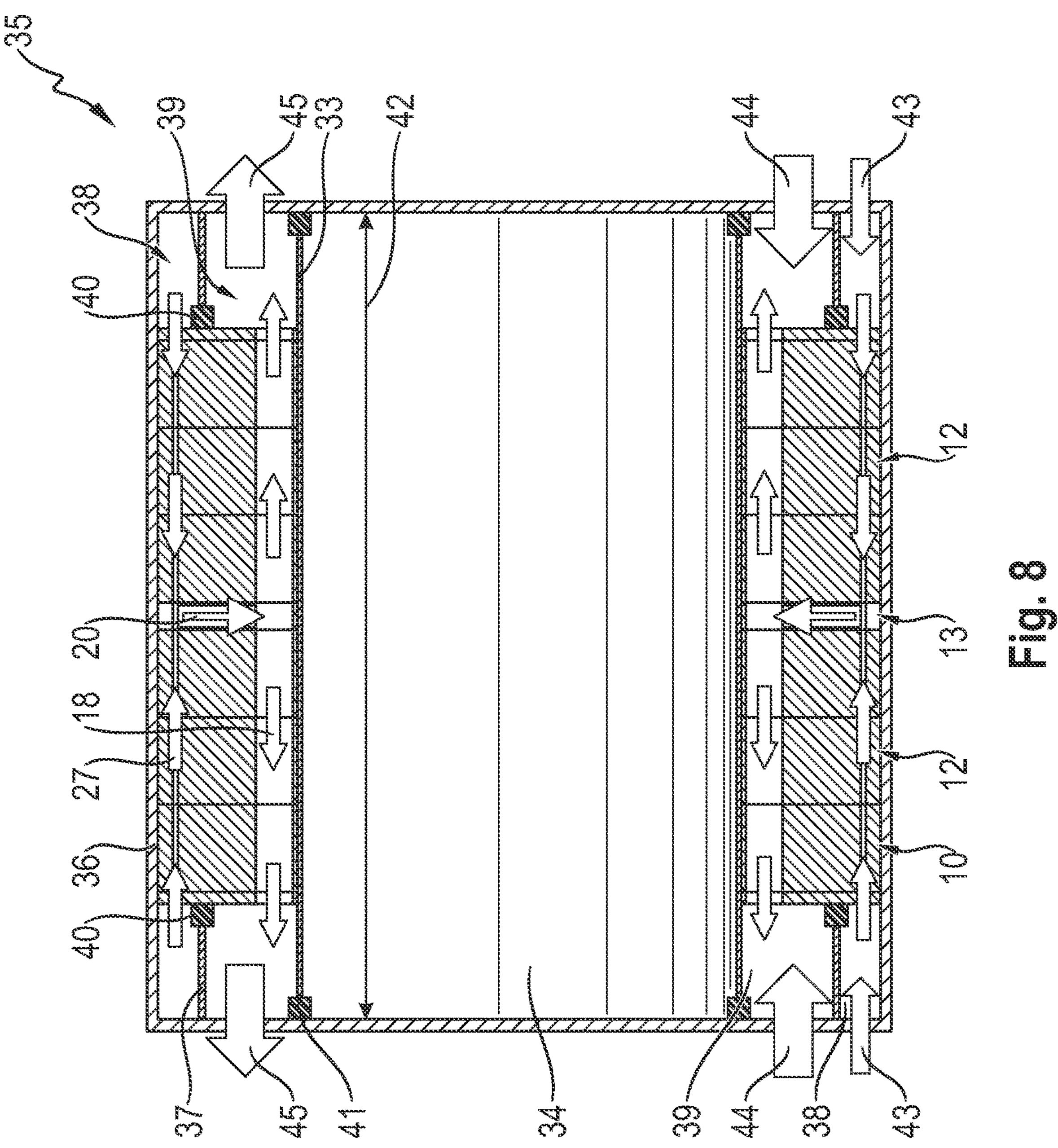
FIG. 8 illustrates a cross section through a stator having a first possible coolant flow.

However, it is preferable that the stator additionally comprise a radially inward sealing body 33, which adjoins the stator laminations 11, the first lamination blanks 14, and the second lamination blanks 15 in a radially inward direction, and which projects in an axial direction opposite both axial ends of the stator lamination package 10. See FIG. 8 in particular for more information. The sealing body 33 can in this case be designed as a self-stable gap tube and have a very thin-walled design between the stator lamination package 11 and a rotor. FIG. 8 shows a space 34 (enclosed by the sealing body 33) for receiving the rotor. Specifically, given that the bars 23 and the laminar gluing of adjacently arranged stator laminations 11 or lamination blanks 14, 15 actually prevent any radially inward flow of the coolant, the sealing body 33 is not subjected to high coolant pressures. Only leaking coolant, which would flow radially inwards via the adhesive or via failing bars 23, will reach the area of the stator lamination package 11 in the direction of the sealing body 33. The ends of the rotor, which project in a radial direction opposite the stator lamination package 11, and which protrude from the gap between the stator lamination package 11 and the rotor, can have a thick-walled design because more installation space is available in that location than in the gap between the stator lamination package 10 and the rotor.

FIGS. 8, 9, 10, and 11 each show schematic axial sections through an electric machine 35 comprising the stator lamination package 10 shown in FIG. 1. Said package is, together with a rotor and the sealing element 33 (which is arranged between the stator lamination package 10 and the rotor) positioned within a housing 36 of the electric machine 35. For the sake of simplicity, neither the stator windings 22 nor the winding heads are shown in FIGS. 8, 9, 10, and 11. Said windings and heads form the stator windings 22 axially adjacent to both axial ends of the stator lamination package 10.

In FIG. 8, the stator grooves 18, the radial coolant channels 20, and the axial coolant channels 27 are shown with a first possible coolant guide, with the coolant guide being indicated by arrows. A sealing body 37 is arranged laterally adjacent the stator lamination package 10, which body divides a space in the housing 36 laterally adjacent the axial ends of the stator lamination package 11 into two subspaces 38, 39, whereby the transition area between the stator lamination package 11 and this sealing body 37 is sealed via a further sealing element 40. Another sealing element 41 seals the transition area between the radially inward sealing body 33 and the housing 36 of the electric machine 35. The double arrow 42 indicates the entire axial extent of the sealing body 33 in the housing 36. The winding heads of the stator windings 22 are arranged in the subspace 39. In FIG. 8, a first coolant inflow 43 is introduced into the subspace 38 in the axial ends of the housing 36, and a second coolant inflow 44 is introduced into subspace 39. The coolant inflow 43 of the coolant introduced into the subspace 38 flows, starting from the axial ends of the stator lamination package 10 and through the axial coolant channels 27 towards the coolant guide element 13, then flows within the coolant guide element 13 via the radial coolant channels 20 from radially outward to radially inward towards the stator grooves 18 and then, starting from the coolant guide element 13 arranged in the center of the stator lamination package 10, flows into the subspaces 39 in both directions, axially outward via the stator grooves 18, to be discharged from the housing 36 as a coolant outflow 45 merging with the coolant inflow 44.

Figure 9:
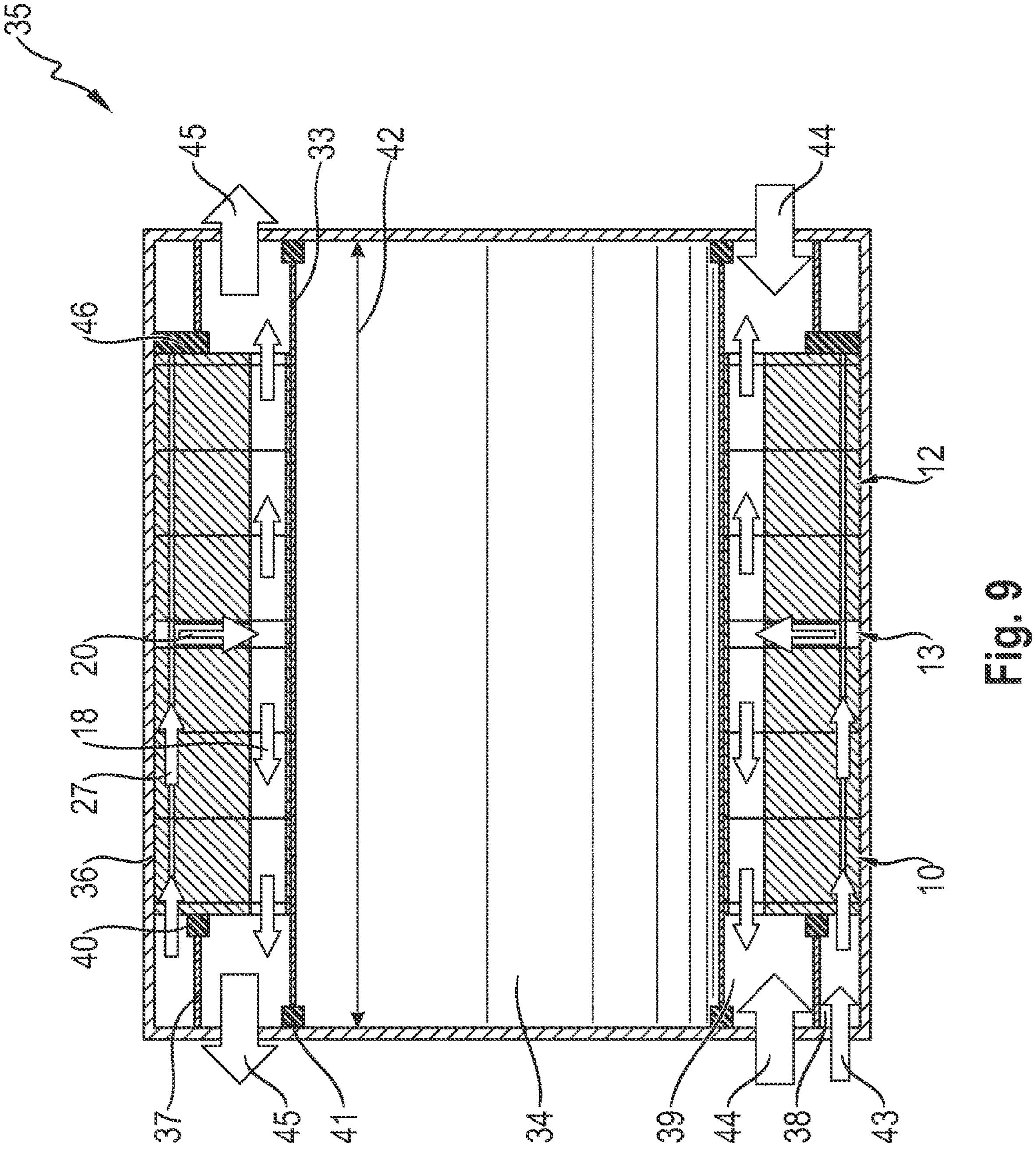
FIG. 9 illustrates a cross section through a stator having a second possible coolant flow.

FIG. 9 shows a modification of FIG. 8, whereby FIG. 9 differs from FIG. 8 in that the axial coolant channels 27 on an axial side of the stator lamination package 10 are closed via a sealing element 46, as shown in in FIG. 9. So, whereas the coolant inflows 43 and 44 in FIG. 8 guide the coolant from both axial sides into the housing 36, this is only true in FIG. 9 for the second coolant inflow 44, but not for the first coolant inflow 43, which in FIG. 9 is only provided on an axial side of the housing 36 of the electric machine 35. Accordingly, in FIG. 9 the flow in the axial coolant channels 37 does not take place through the entire axial extent of the stator lamination package 10, but only about half of the axial extent of the stator lamination package 10.

Figure 10:
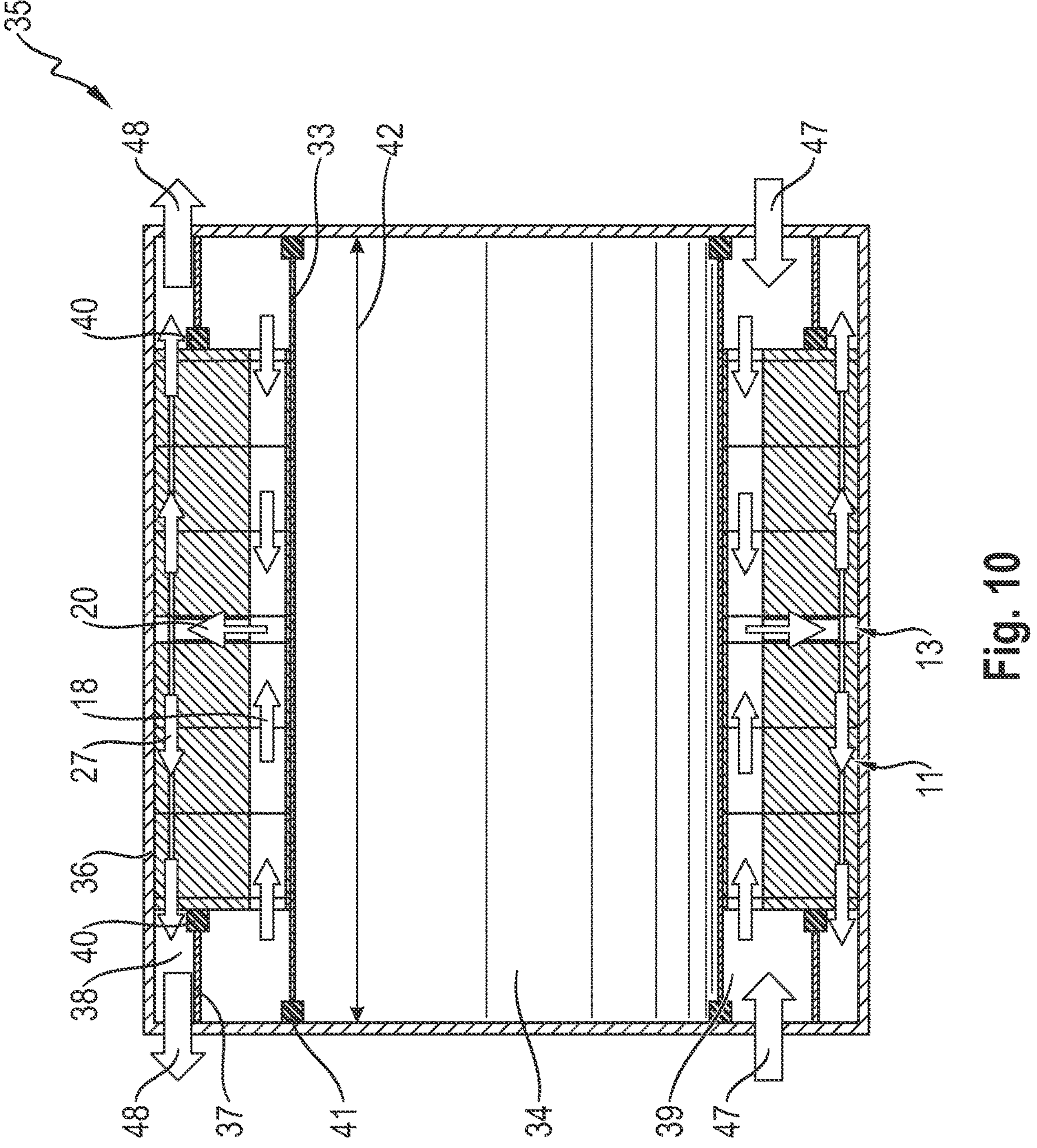
FIG. 10 illustrates a cross section through a stator having a third possible coolant flow.

FIG. 10 shows another modification for guiding the coolant through the electric machine 35. In FIG. 10, in contrast to FIGS. 8 and 9, the radial coolant channels 20 of the coolant guide element 13 do not flow from radially outward to radially inwards, but rather vice versa, i.e., from radially inward to radially outwards. So, in FIG. 10, the coolant first flows through the stator grooves 18, and only then through the axial coolant channels 27. This flow is reversed in FIGS. 8 and 9, so the coolant in FIGS. 8 and 9 first flows through the axial coolant channels 27, and then the stator grooves 18. In FIG. 10, the coolant inflow 47 occurs from outward, into the housing 36 at both opposing axial ends of the housing 36 and into the respective subspace 39 where the respective winding head is arranged. Coolant entering via the coolant inflows 47 to the housing 36 initially flows axially inward from the axial ends of the stator lamination package 11 and towards the coolant guide element 13 via the stator grooves 18, then flows from radially outward via the radial coolant channels 20 to axially outward, then from the coolant guide element 13 via the axial coolant channels 27 and toward the axial ends of the stator lamination package 11, to be discharged from the housing 36 via the respective subspace 38, i.e., at both axial ends of the housing 36 via a respective coolant outflow 48.

Figure 11:
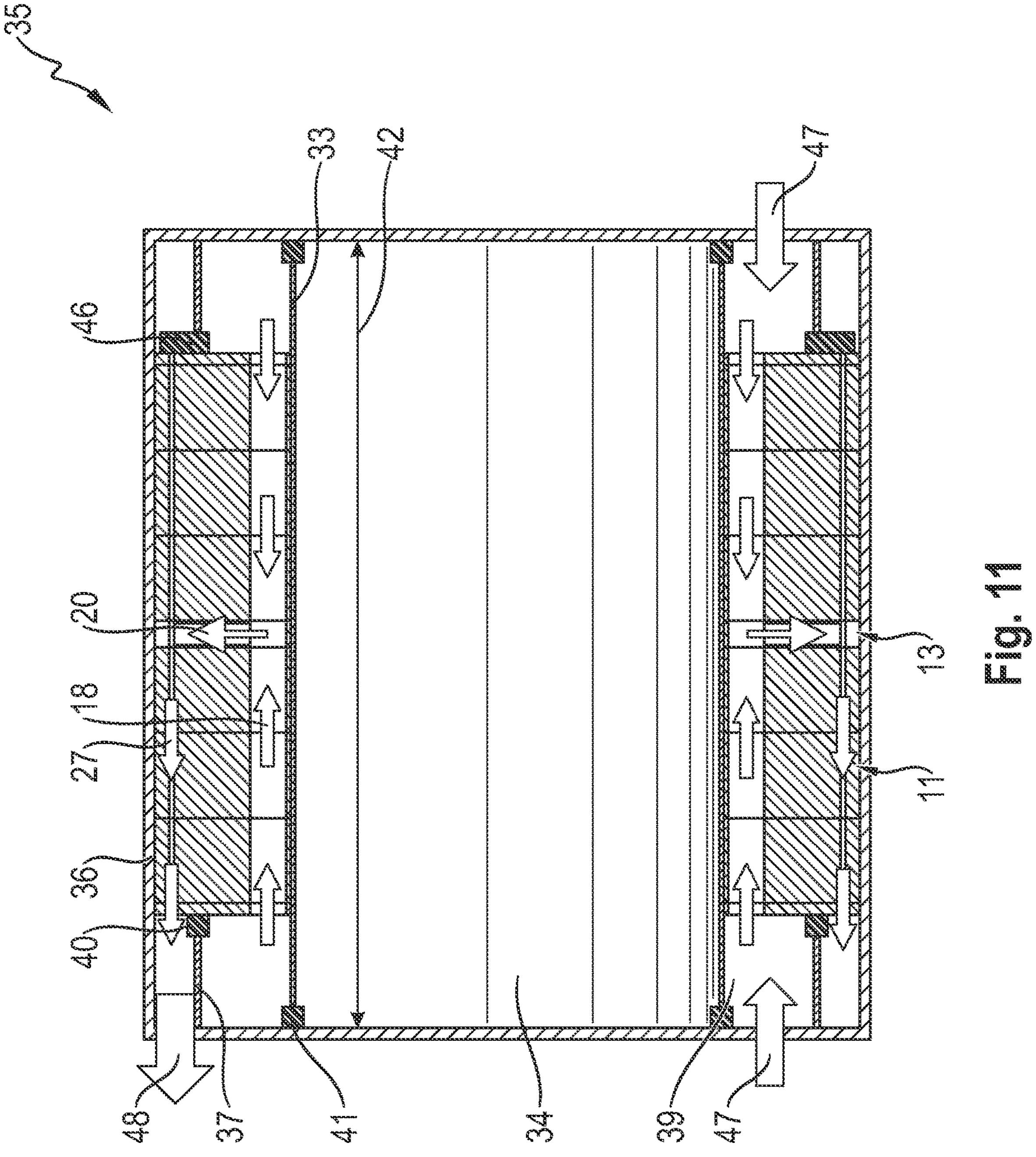
FIG. 11 illustrates a cross section through a stator having a fourth possible coolant flow.

Accordingly, in FIG. 10 the coolant inflow 47 enters at both axial ends of the housing 36, and the coolant outflow 48 likewise exits at both axial ends of the housing 36. In contrast, FIG. 11 shows a modification of FIG. 10, which differs from FIG. 10 only in that the coolant outflow 48 only exits at one axial end of the housing 36. The axial coolant channels 27 of the stator lamination package 11 are sealed at an axial end of the latter via the sealing element 46. Therefore, whereas in FIG. 10 both the coolant inflow 47 and coolant outflow 48 takes place at each of the axial ends of the housing 36 of the electric machine 35. In FIG. 11, only the coolant inflow 47 enters at both axial ends, and the coolant outflow 48 occurs at one axial end.

Therefore, a variety of coolant guides can be provided using said stator 10 or stator lamination package 11 in a flexible manner in order to enable ideal cooling of the stator area of the electric machine 35, depending on the particular application.

Figure 12:
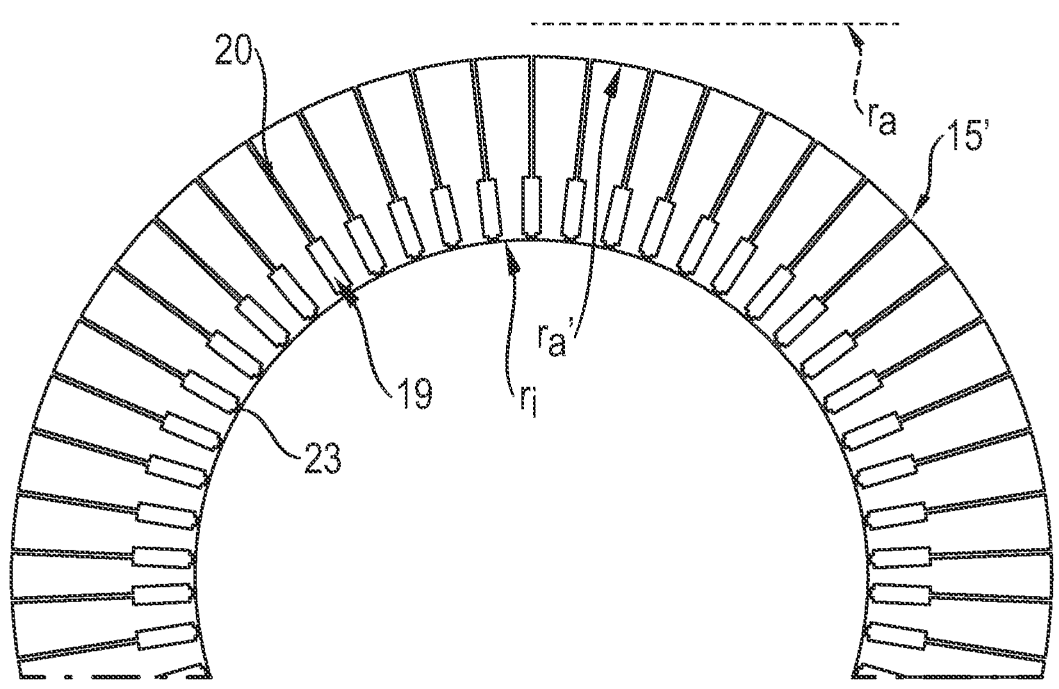
FIG. 12 illustrates an alternative to FIG. 4.
Figure 13:
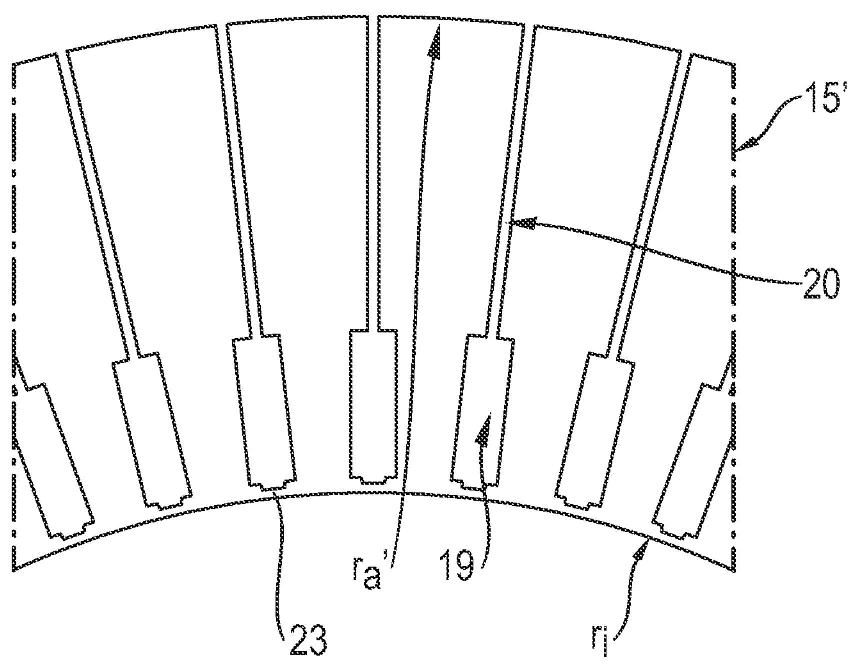
FIG. 13 illustrates a detail of FIG. 12.

In the exemplary embodiment shown in FIGS. 2 to 7, both the stator laminations 11 and the two lamination blanks 14, 15 have identical inner radii and identical outer radii, so that a continuous cylindrical contour is accordingly achieved radially inward and radially outward over the entire axial extent of the stator lamination package 10. In contrast, FIGS. 12 and 13 show a modification of stator 10, i.e., a modification of second lamination blanks 15', which differ from the lamination blanks 15 of FIG. 2 by having a different radially outward design. Thus, in FIGS. 12 and 13, a second lamination blank 15' is shown for the coolant guide element 13, which has the same inner radius in a radially inward direction as the first lamination blanks 14, and the stator laminations 11 which, however, are designed to have a correspondingly shorter outer radius in a radially outward direction than the first lamination blanks 14 and the stator laminations 11, whose outer radius is indicated in FIG. 12 by a dashed line.

Accordingly, the second lamination blanks 15' shown in FIGS. 12, 13 do not comprise the recesses 26 and 30. Rather, when the coolant guide element 13 employs the second lamination blanks 15' shown in FIGS. 12 and 13, the radially outward axial coolant channels 27 open into a cavity 49 formed between the radially outward contour of the second lamination blanks 15' and the housing 36 of the respective electric machine 35. Optionally, the axial coolant channels 27 formed radially outward on the stator lamination package 10 can then also be omitted.

Figure 14:
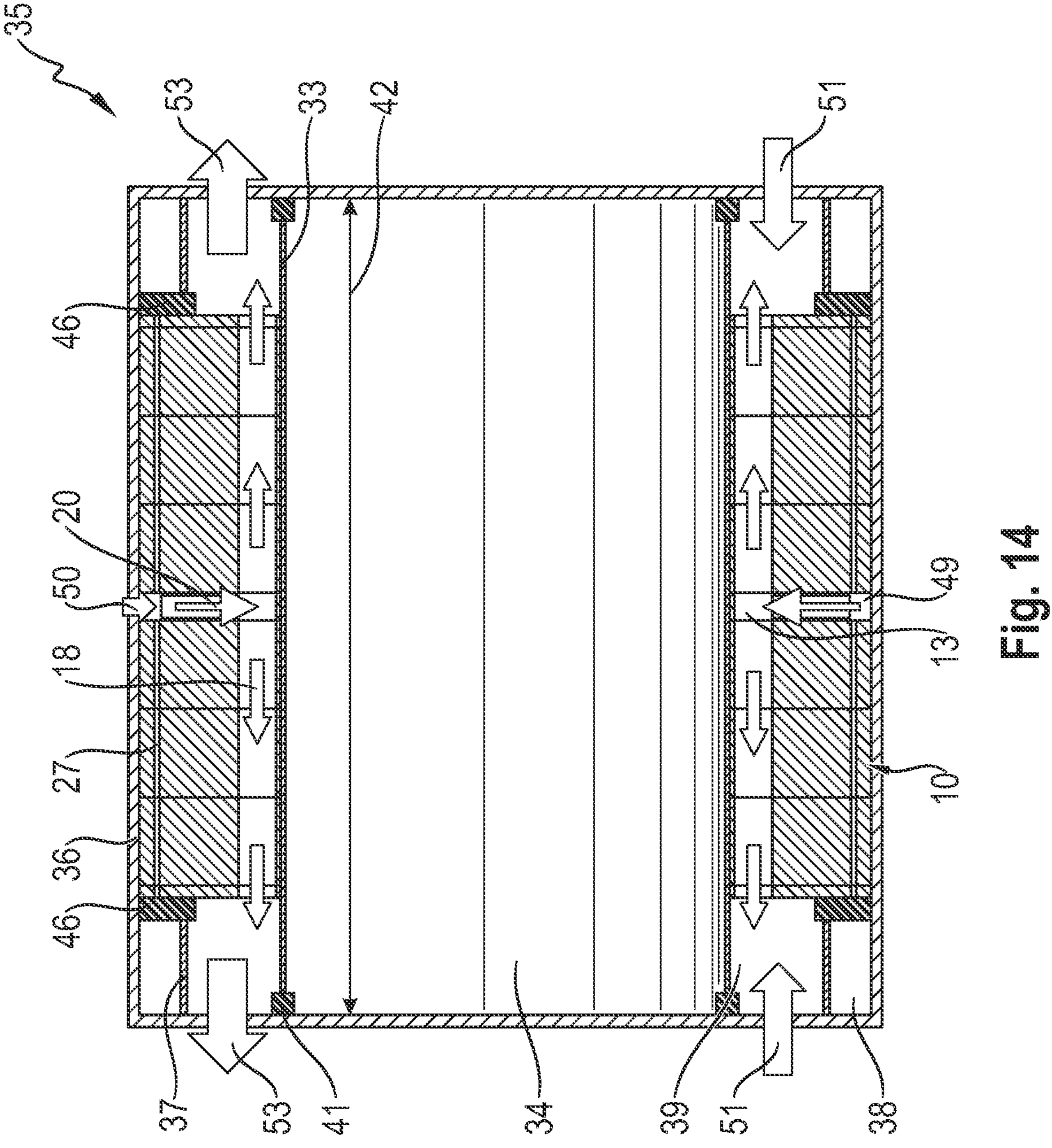
FIG. 14 illustrates a cross section through a stator having a fifth possible coolant flow.

FIG. 14 illustrates one possible guidance for the coolant through the electric machine 35 for an electric machine 35 in which the second lamination blanks 15' shown in FIGS. 12 and 13 are used in the area of the coolant guide element 13.

For example, in FIG. 14 a coolant inflow 50 in the axial center of the stator lamination package 10 takes place via the housing 36 in the area of the coolant guide element 13 into the cavity 49 between the coolant guide element 13 and the housing 36 of the electric machine 35. This coolant flows through the radial coolant channels 20 from radially outward to radially inward and enters the stator grooves 18 to flow axially outward in both axial directions from the coolant guide element 13 via the stator grooves 18 and into the area of the subspaces 39 where the winding heads are arranged. In FIG. 14 a second coolant inflow 51 takes place from both axial sides of the housing 36 and into the subspaces 39, where it merges with the subflow from the coolant inflow 50 via the stator grooves 18, to then be discharged from the housing 36 at both axial ends of the housing 36 as a coolant outflow 53. In FIG. 14 the radially outer axial coolant channels 27 are closed at both axial ends of the stator lamination package 10 by means of the sealing bodies 46 such that in FIG. 14 no coolant flows through these axial coolant channels 27.

Figure 15:
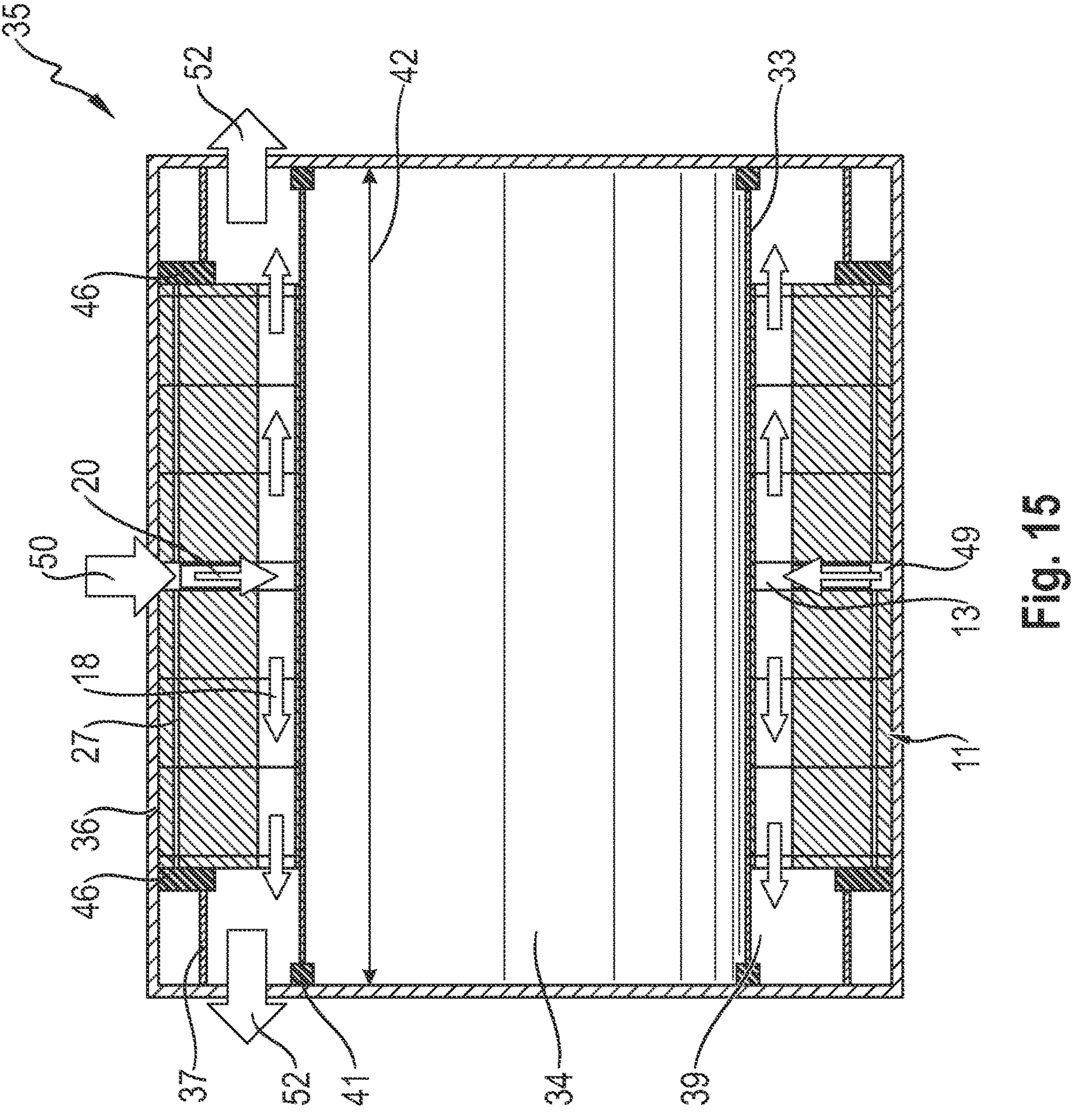
FIG. 15 illustrates a cross section through a stator having a sixth possible coolant flow.

A modification of FIG. 14 is shown in FIG. 15, whereby FIG. 15 differs from FIG. 14 only in that a central coolant inflow 50 in the axial center of the housing 36 of the electric machine 35 is used in FIG. 15, which inflow is formed in the cavity 49 between the coolant guide element 13 and the housing 36 comprising the second lamination blanks 15' shown in FIGS. 12 and 13. Accordingly, in FIG. 15 no coolant inflow 51 takes place at the axial ends of the housing 36. The coolant, which is introduced into the housing 36 via the coolant inflow 50 and into the cavity 49 between the coolant guide element 13 and the housing 36, flows from radially outward to radially inward via the radial coolant channels 20, enters the stator grooves 18, flows via the stator grooves 18 towards both axial ends of the stator lamination package 11, where it exits from the stator lamination package 11 and into the respective subspace 39, to be discharged from the housing 36 at both axial ends of the housing 36 as a coolant outflow 52. Also in FIG. 15, the axial coolant channels 27 are closed by the sealing body 46, so that no coolant flows through them. Said channels could also be omitted. The winding heads are arranged within the subspaces 39.

Figure 16:
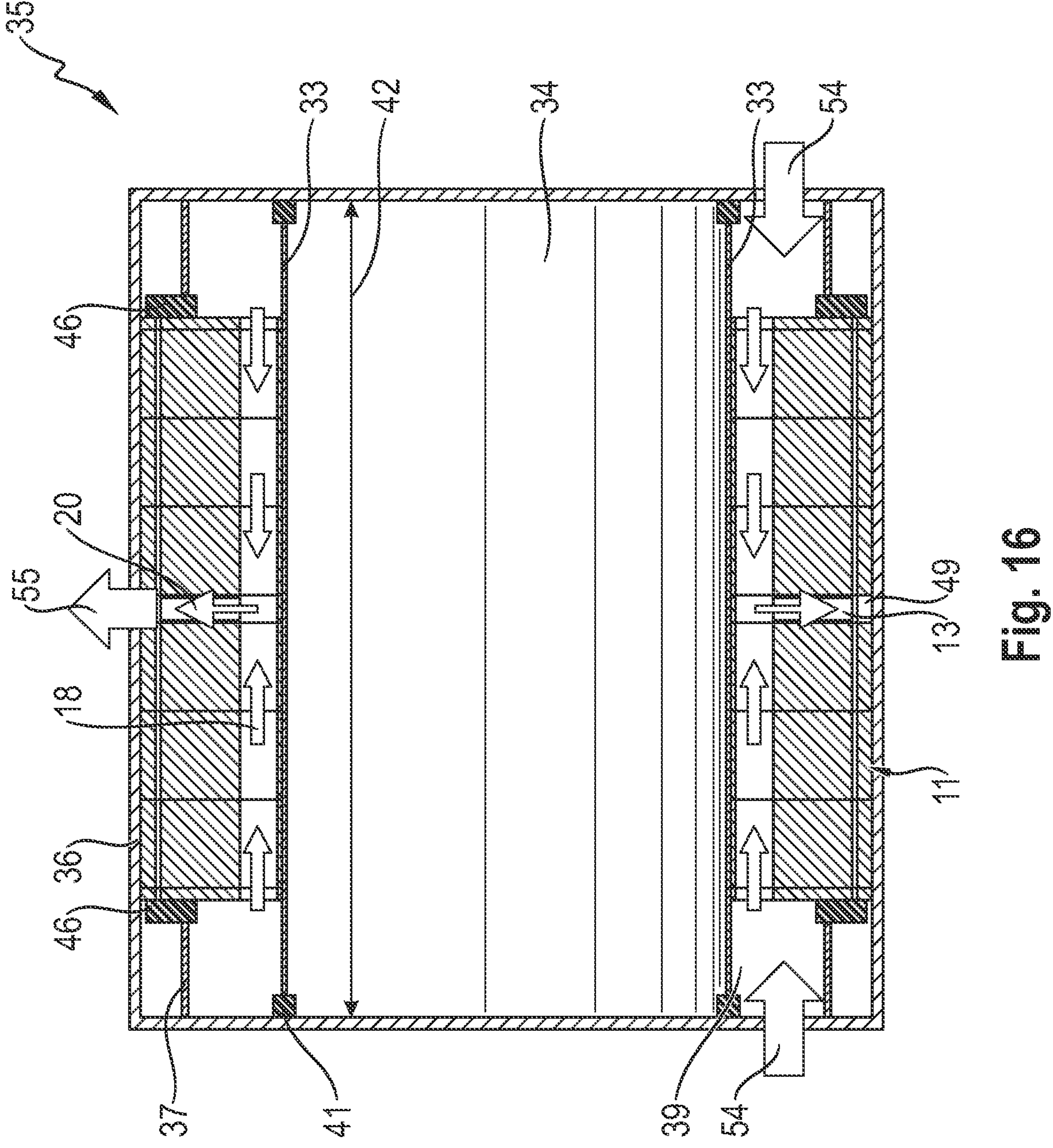
FIG. 16 illustrates a cross section through a stator having a seventh possible coolant flow.

Another variant is shown in FIG. 16, which differs from the variant shown in FIG. 15 only by a reversed direction of flow. In FIG. 15 the coolant coming from both axial sides of the housing 36 of the electric machine 35 is guided from the subspaces 39 as a coolant inflow 54, which then enters the stator grooves 18 at the axial ends of the stator lamination package 11, flows axially inward towards the oil guide element 13 starting from the axial ends through the stator grooves 18, to then flow radially outward via the radial coolant channels 20 in the area of the oil guide element 13 and into the cavity 49 between the housing 36 and the coolant guide element. In this central region of the stator lamination package 11, where the coolant guide element 13 is located, a central coolant outflow 55 from the housing 36 then exits via the housing 36. The winding heads are arranged within the subspaces 39.

Therefore, whereas in FIG. 15 the flow through the radial coolant guide channels 20 of the second lamination blanks 15' shown in FIGS. 12 and 13 takes place from radially outward to radially inward, in FIG. 16 the flow through these radial coolant channels 20 takes place from radially inward to radially outward. Accordingly, FIGS. 15 and 16 differ from one another only in that the direction of flow of the coolant through the electric machine 35 (i.e., the stator or stator lamination package 11 thereof) is reversed.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A stator of an electric machine, comprising:

a stator lamination package comprising a plurality of stator laminations, wherein the stator laminations comprise radially inward recesses that define portions of axially extending stator grooves, and wherein stator windings are arranged in the stator grooves, directly around which windings a coolant can flow within the stator grooves;

a coolant guide arranged between the stator laminations of the stator lamination package; and a contained space bordering the axially extending stator grooves on each axial end of the stator lamination package, wherein each contained space is configured to exchange coolant with the axially extending stator grooves, and wherein each contained space is configured to be sealed from a rotor and sealed radially outwardly by a dividing sealing body, wherein the coolant guide comprises first lamination blanks axially bordering the coolant guide on opposite sides thereof, wherein the coolant guide comprises second lamination blanks arranged between the first lamination blanks, wherein the first lamination blanks and the second lamination blanks as well as the stator laminations radially comprise inward recesses for defining the stator grooves and for receiving the stator windings, wherein only the second lamination blanks additionally comprise radial coolant channels extending radially outward from the stator grooves and configured to guide the coolant radially inward towards the stator grooves or radially outward from the stator grooves, wherein the radially inward recesses of the stator laminations and the lamination blanks of the coolant guide and thus the stator grooves are closed in a radially inward direction by the stator laminations and the lamination blanks, wherein axially adjacent stator laminations and lamination blanks of the stator lamination package and the coolant guide are glued together in a laminar manner, wherein the stator lamination package is configured to receive the coolant axially inward on both axial sides of the stator lamination package and radially inward via the radial coolant channels extending radially outward from the stator grooves, wherein the stator lamination package is configured to discharge the coolant axially outward via the axially extending stator grooves on both axial sides of the stator lamination package, and wherein each contained space borders a radially outward second contained space on each axial end of the stator lamination package, wherein each second contained space is configured to exchange coolant with radially outward recesses extending through the stator lamination package, and wherein each second contained space is sealed radially inwardly by the respective dividing sealing body that radially outwardly seals each respective contained space.

2. The stator according to claim 1, wherein at least the stator laminations of the stator lamination package and the first lamination blanks of the coolant guide comprise the radially outward recesses, at least portions of which border axial coolant channels for guiding the coolant.

3. The stator according to claim 2, wherein the second lamination blanks of the coolant guide also comprise the radially outward recesses, which together border the axial coolant channels, wherein the radial coolant channels of the second lamination blanks extend between the stator grooves and the axial coolant channels.

4. The stator according to claim 2, wherein the second lamination blanks of the coolant guide are designed to have the same length radially inward and to have a shorter length radially outward than the first lamination blanks of the coolant guide and the stator laminations, and wherein the radial coolant channels of the second lamination blanks extend from a radially outward circumference of the second lamination blanks towards the stator grooves.

5. The stator according to claim 1, wherein the first lamination blanks of the coolant guide axially cover the radial coolant channels of the second lamination blanks of the coolant guide.

6. The stator according to claim 1, wherein at least the first lamination blanks of the coolant guide and the stator laminations comprise radially outward cavities, which are designed to provide radial deformability of the stator lamination package.

7. The stator according to claim 1, wherein the stator laminations, the first lamination blanks, and the second lamination blanks are made of an identical material.

8. The stator according to claim 1, comprising a sealing body, which adjoins the stator laminations, the first lamination blanks, and the second lamination blanks in the radially inward direction, and which projects in an axial direction opposite the stator lamination package.

9. The stator according to claim 8, wherein the sealing body is designed as a self-stable gap tube, which adjoins the stator laminations and the first and second lamination blanks in the radially inward direction without being connected to the stator lamination package.

10. The stator according to claim 9, wherein the coolant guide is arranged, in the axial direction, in a center of the stator lamination package.

11. The stator according to claim 8, wherein the sealing body further adjoins the contained space in the radially inward direction and is configured to be arranged between the contained space and the rotor.

12. An electric machine comprising a stator according to claim 1 and a rotor.

13. The stator according to claim 1, wherein each of the stator laminations and the first lamination blanks comprise a respective monolithic construction radially surrounding the stator grooves to enclose the stator grooves.

14. The stator according to claim 1, wherein each second contained space is configured to exchange coolant axially inwardly with the radially outward recesses.

* * * * *